United States Patent [19]

Miyajima

[11] Patent Number: 5,049,866
[45] Date of Patent: Sep. 17, 1991

[54] LIQUID CRYSTAL DISPLAY DEVICE

[75] Inventor: Akira Miyajima, Tokorozawa, Japan

[73] Assignee: Citizen Watch Co., Ltd., Tokyo, Japan

[21] Appl. No.: 381,953

[22] Filed: Jul. 19, 1989

[30] Foreign Application Priority Data

Jul. 26, 1988 [JP] Japan .................................. 63-98645

[51] Int. Cl.⁵ .......................................... G09G 3/36
[52] U.S. Cl. ................................... 340/784; 340/765; 359/40
[58] Field of Search ............................ 340/784, 765; 350/331 R, 330, 337, 332; 353/122, 119, 60

[56] References Cited

U.S. PATENT DOCUMENTS

| | | | |
|---|---|---|---|
| 4,944,578 | 7/1990 | Denison | 350/337 |
| 4,950,072 | 8/1990 | Honda | 350/330 |
| 4,963,001 | 10/1990 | Miyajima | 350/334 |

Primary Examiner—Jeffery A. Brier
Assistant Examiner—Doon Y. Chow
Attorney, Agent, or Firm—Birch, Stewart, Kolasch & Birch

[57] ABSTRACT

A liquid crystal display device used in a projector for projecting an image on a liquid crystal display panel onto a screen, the display device including a housing having a panel housing portion and a control circuit housing portion, the liquid crystal display panel being housed in the panel housing portion, and a control circuit housed in the control circuit housing portion, circuit chips mounted on glasses of the liquid crystal display panel for driving electrodes of the panel, the panel housing portion having a pair of attached portions formed on opposite longitudinal sides thereof, which are attached to the projector, a thickness of each side of the attached portions being less than 6 mm, and a width of the panel housing portion being about 50 mm.

3 Claims, 10 Drawing Sheets

LIQUID CRYSTAL DISPLAY DEVICE

BACKGROUND OF THE INVENTION

1. Field of the Invention

The present invention relates to a small liquid crystal display device which is inserted in a projector for projecting an image on the liquid crystal display device onto a screen.

2. Discussion of the Related Art

The liquid crystal display device used for the purpose of the projection of an image is classified into two large groups as follows:

(I) A liquid crystal projector having a light source, a lens for magnifying the image, and a liquid crystal display panel integrally assembled in the projector; and (II) A projector having a light source and a lens for magnifying the image, in which a liquid crystal display device is detachably mounted.

Further, the system of (II) is divided into two types.

(II-1) An over head projector (OHP) on which a liquid crystal display device is mounted.

(II-2) A slide projector in which a liquid crystal display device is inserted.

The systems of groups (I) and (II-1) are produced now.

Since, the system of the group (I) has the light source and the lens, manufacturing cost becomes high. Further, the system can not be used for another purpose such as a projector for projecting the slide. Since the system is large in size, it is difficult to improve portability of the system.

For the projector of the group (II-1), a liquid crystal display panel having a large size, such as size A4 must be provided. It is difficult to manufacture such a large liquid crystal display panel, because of difficulties in patterning and in providing a uniform gap between an upper glass and a lower glass of the panel, thereby deteriorating yield of the panel which causes increase of the manufacturing cost.

Japanese Utility Model Application Laid-open Publications 61-119145 and 62-12147 disclose a system of group (II-2).

FIG. 8 shows a conventional liquid crystal display device disclosed in the Japanese Utility Model Application Laid-open Publication 61-119145. The device comprises a projector 600 in which a light source 603 and a plurality of lenses 601 are provided. A liquid crystal display panel module 606 is adapted to attach to the projector 600 and electrically connected thereto through a connector 607 of the module 606 and a connector 604 of the projector 600. The module 606 is illuminated by the light source 603 and an image of the module is magnified by lenses 601 and projected on a screen 610. Since the module 606 can not be attached to an ordinary projector, the projector 600 must be carried together with modules 606.

FIGS. 9a and 9b show another conventional device disclosed in the Japanese Utility Model Application Laid-open Publication 62-12147. A holder 706 is interposed between a light source 702 and a lens 704 in a projector 700. The holder 706 is adapted to hold a slide film 707 and a liquid crystal display plate 703. The holder 706 attached to the projector 700 is reciprocated in the horizontal direction as shown by arrows a- and b in FIG. 9a, so that either of the slide 707 and the plate 703 may be selected. Thus, an image is projected on a screen 705.

In the system, since a particular projector is required, an ordinary slide projector can not be used. Consequently, the module and the holder must be carried together with the projector also in this system.

SUMMARY OF THE INVENTION

The object of the present invention is to provide a liquid crystal display device which is capable of being used in an ordinary projector, for projecting magnified images.

According to the present invention, there is provided a liquid crystal display device inserted between a light source and a lens of a projector for projecting an image on a liquid crystal display panel onto a screen. The device comprises a housing comprising a front cover, rear cover and a panel housing portion and a control circuit housing portion which are longitudinally arranged, the liquid crystal display panel being housed in the panel housing portion, a control circuit housed in the control circuit housing portion, circuit chips mounted on glasses of the liquid crystal display panel for driving electrodes of the panel, connecting means for connecting the circuit chips with the control circuit, and a pair of attached portions formed on opposite longitudinal sides of the panel housing portion, which are arranged to be attached to the projector, the thickness of each of the attached portions being less than 6 mm, and the width of the panel housing portion being about 50 mm.

In one aspect of the invention, the thickness of the attached portion is smaller than the thickness of the panel housing portion and the thickness of the panel housing portion is smaller than the thickness of the control circuit housing portion.

These and other objects and features of the present invention will become more apparent from the following detailed description with reference to the accompanying drawings.

BRIEF DESCRIPTION OF DRAWINGS

FIG. 2 is an enlarged sectional view of &he device taken along line II—II of FIG. 1a;

FIG. 4b is a bottom view of the device of FIG. 4a;

FIG. 5d is a sectional view of the panel taken along a line V—V of FIG. 5a;

DETAILED DESCRIPTION OF THE INVENTION

Figure 1B:
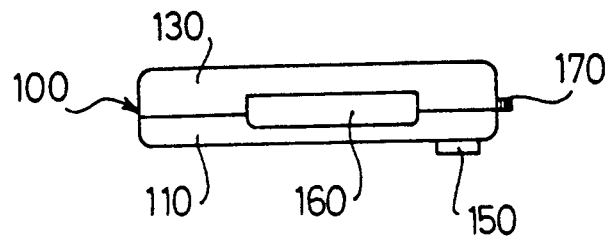
FIG. 1b is a top view of the device.
Figure 1A:
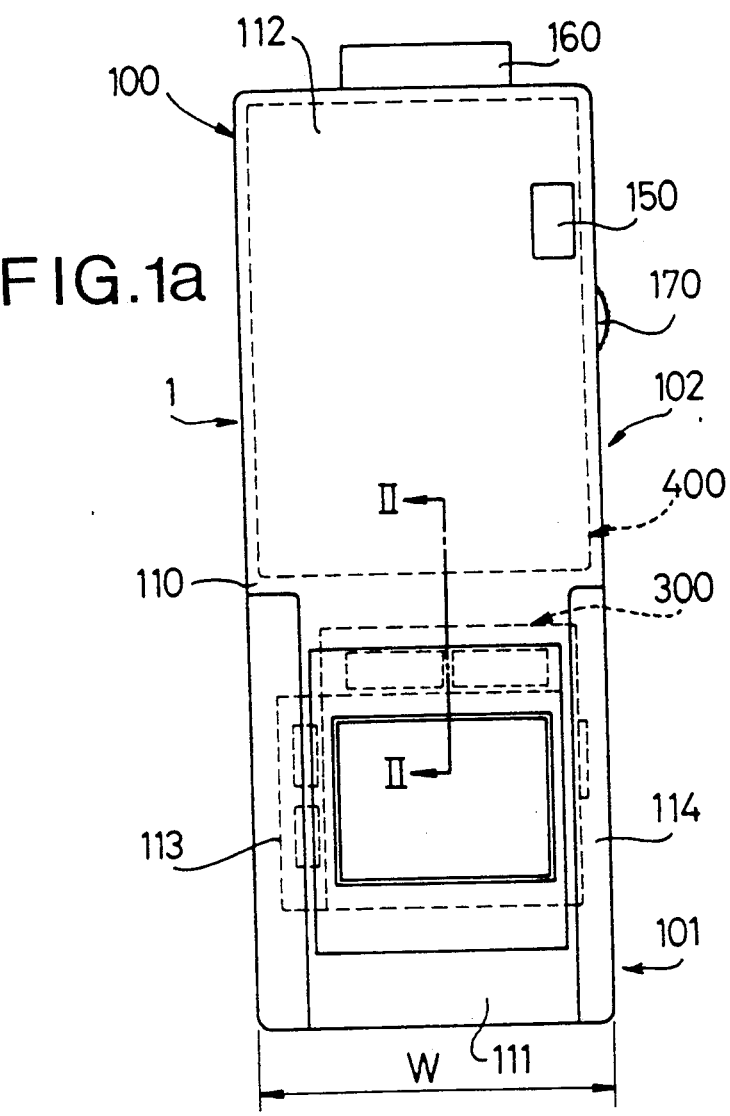
FIG. 1a is a front view of a small liquid crystal display device according to the present invention.
Figure 1C:
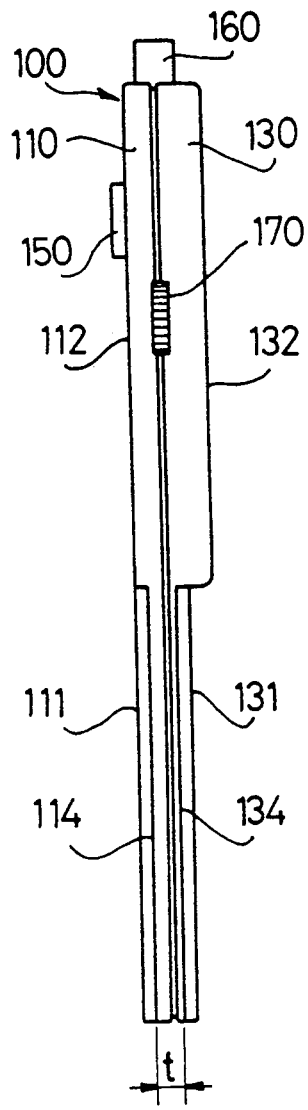
FIG. 1c is a bottom view of the device.

Referring to FIGS. 1a to 1d, a small liquid crystal display device 1 according to the present invention comprises a housing 100 made of plastics having a front cover 110 and a rear cover 130. The housing 100 is divided into a panel housing 101 at a lower portion, and a control circuit housing portion 102 at an upper portion, which are longitudinally arranged. A liquid crystal display panel 300 and a control circuit board 400 for controlling the panel 300 are housed in the panel housing portion 101 and the control circuit housing portion 102 as shown by dotted lines of FIG. 1a. As shown in FIG. 1c, a lower part of the rear cover 130 is reduced in thickness to form a thinner panel housing 131. At the panel housing portion 101 of the housing section 100, the front cover 110 has a panel housing section 111 to form the panel housing portion 101 together with the panel housing 131, in which the liquid crystal display panel 300 is mounted. At the upper portion of the housing 100, the front cover 110 and the rear cover 130 form circuit housings 112 and 132 respectively, in which the control circuit board 400 is mounted.

The panel section 111 has thin holding portions 113 and 114 formed on opposite sides thereof. The panel housing 131 also has thin holding portions 133 and 134 formed on opposite sides thereof, corresponding to holding portions 113 and 114, respectively.

When the liquid crystal display device 1 is attached to a projector, the device 1 is engaged with the projector at the holding portions 113, 114, 133 and 134, which will be described hereinafter.

Figure 1D:
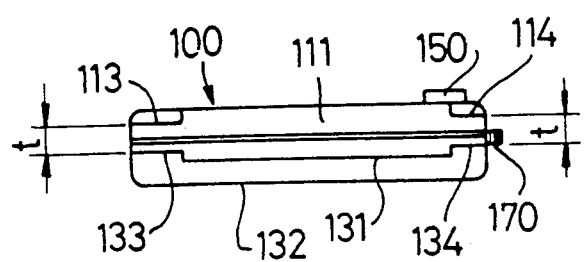
FIG. 1d is a side view of the device.

As shown in FIG. 1d, a left side attached portion composed by holding portions 113 and 133 has a thickness t and a right side attached portion formed by holding portions 114 and 134 also has a thickness t. The thickness t is about 1 mm which is a minimum to maintain the strength of the housing 100. If the thickness t becomes larger than a predetermined value, the liquid crystal display device 1 can not be attached to some types of projectors. Therefore, the thickness t is preferably limited to be less than 6 mm so as to increase the applicability of the display device 1 to the projector. The width W of the housing at the attached portion is about 50 mm which is a normal width of the slide film.

The display device 1 has a power switch button 150 on the circuit& housing 112, a dial 170 for controlling luminance of the display panel, which is provided on a right side of the housing 100, and an external connector 160 on the top of the housing 100 for receiving an outside signal.

Figure 2:
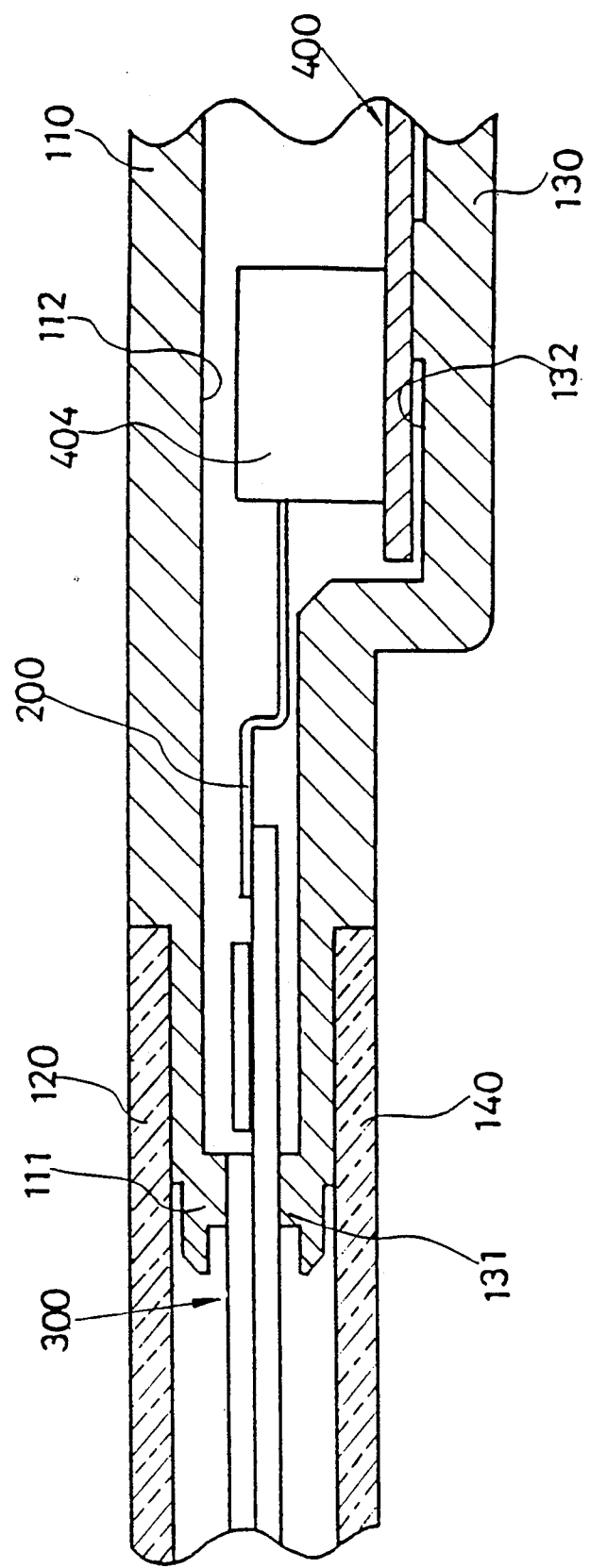

FIG. 2 shows a part of the liquid crystal display panel 300 disposed between the panel housing 111 of the front cover 110 and the panel housing 131 of the rear cover 130, and a part of the control circuit board 400 of the liquid crystal display device 1, which is disposed between the circuit housing 112 of the front cover 110 and the circuit housing 132 of the rear cover 130. A panel connecting substrate 200 made of a flexible printed circuit board (FPC) is provided for connecting an internal connector 404 of a control circuit on the circuit board 400 to the liquid crystal display panel 300. Front and rear transparent shielding plates 120 and 140 made of acrylic material are provided in openings formed in the panel housings 111 and 131, respectively, for protecting the display panel 300.

Figure 5B:
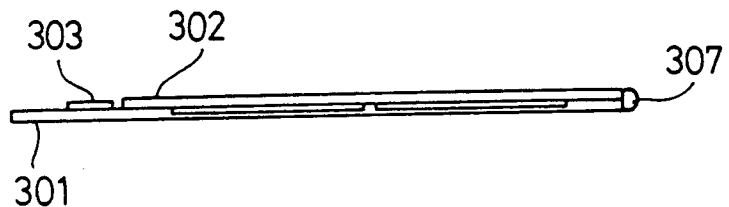
FIG. 5b is a top view of the panel.
Figures 5A, 5C:
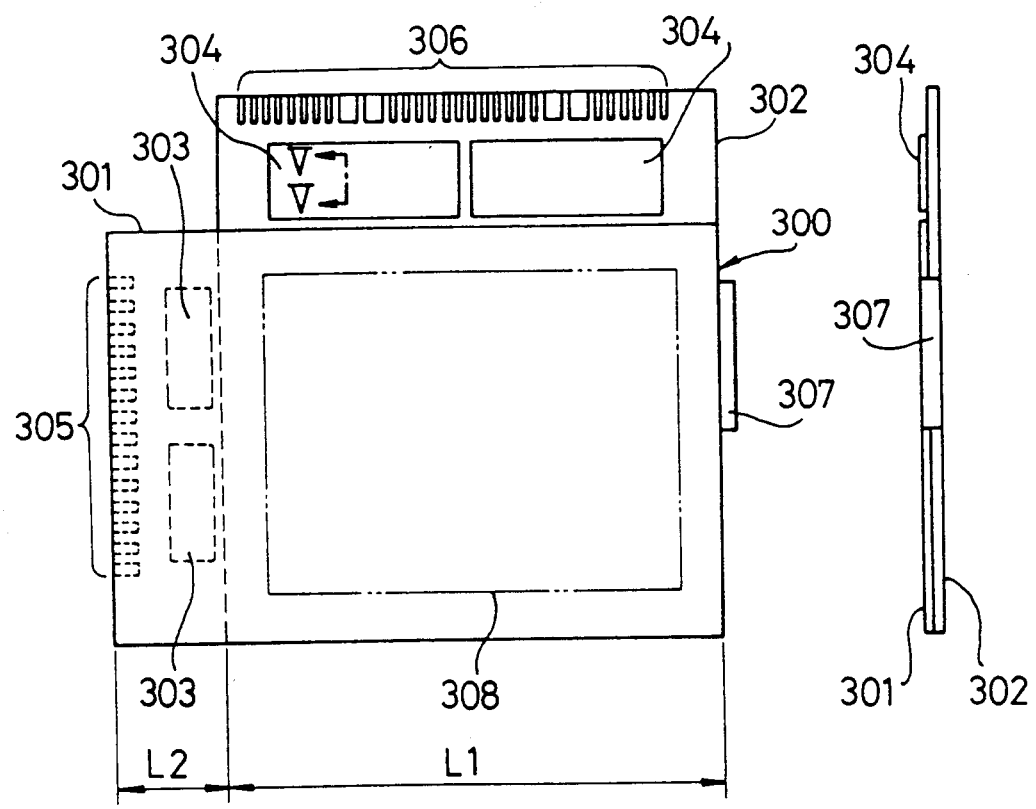
FIG. 5a is a front view showing a liquid crystal display panel of the device.
FIG. 5c is a side view of the panel.

Referring to FIGS. 5a to 5c, the liquid crystal display panel 300 comprises a glass 301 having scanning electrodes thereon, a glass 302 having signal electrodes thereon, and liquid crystal injected between glasses 301 and 302 through a hole which is sealed by a plug 307. Since the width W (FIG. 1a) of panel housings 111 and 131 is 50 mm, the width of the glass 301 is smaller than W, for example, L1 is 35 mm and L2 is 8 mm. In the present invention, driving circuits for driving the display panel 300 are provided on the glasses 301 and 302 in the form of chips, which is called chip-on-glass (COG) method. The glass 301 has scanning electrode driving circuit chips 303 mounted thereon and input terminals 305 for scanning electrode driving circuit chips 303. The glass 302 has signal electrode driving circuit chips 304 mounted thereon and input terminals 306 for signal electrode driving circuit chips 304. These chips are adhered to the glasses by paste, as described hereinafter. The image is displayed in a region defined by a dot-dash line 308. In the image display region 308, a pitch between electrodes is 45 μm.

Figure 5D:
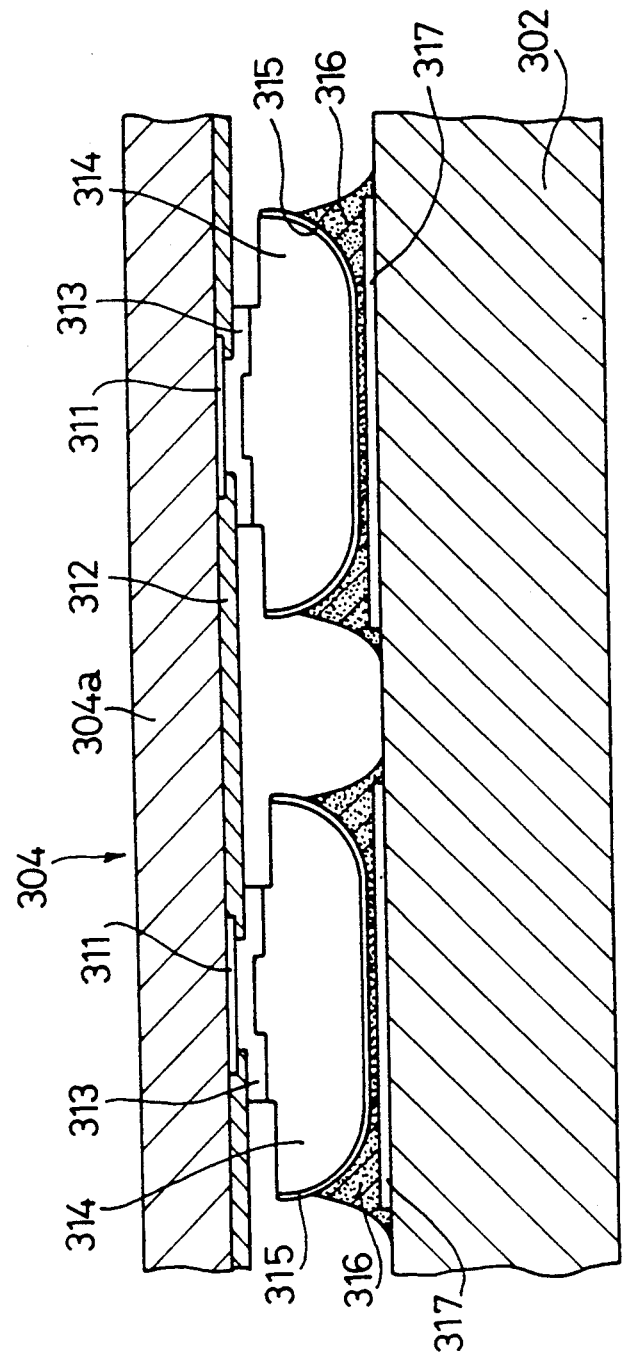

FIG. 5d shows the structure of the signal electrode driving circuit chip 304. The signal electrode driving circuit chip 304 comprises a substrate 304a, a plurality of aluminum pads 311 provided on the substrate 304a, protector films 312 provided for covering the surface of the substrate 304a except the aluminum pads 311. A bump 314 made of copper is connected to each aluminum pad 311 through a metallic adhesion layer 313. The bump 314 is covered with an oxide film 315 and is adhered to each transparent signal electrode 317 formed on the glass 302 through a paste 316.

Figure 6:
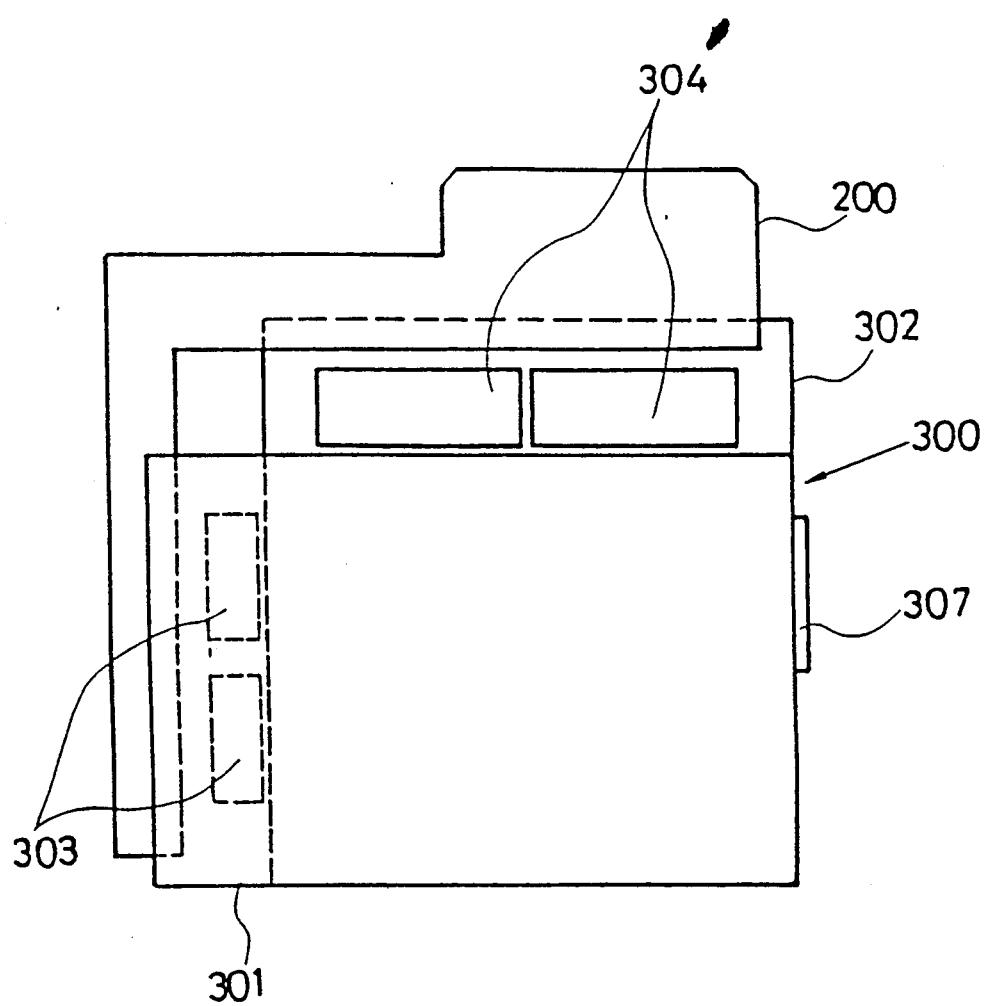
FIG. 6 is a schematic front view showing a liquid crystal display panel block.

Referring to FIG. 6, the glasses 301 and 302, scanning electrode driving circuit chit 303, signal electrode driving circuit 304, and plug 307 for the liquid crystal display panel 300 are the same as those of FIGS. 5a to 5d. The input terminals 305 and 306 on the glasses 301 and 302 ar connected to the panel connecting substrate 200 by unisotropic conductive adhesive. Thus, a liquid crystal display panel block is formed. The panel connecting substrate 200 is connected to the control circuit board 400 through the internal connector 404 (FIG. 2).

Figure 7:
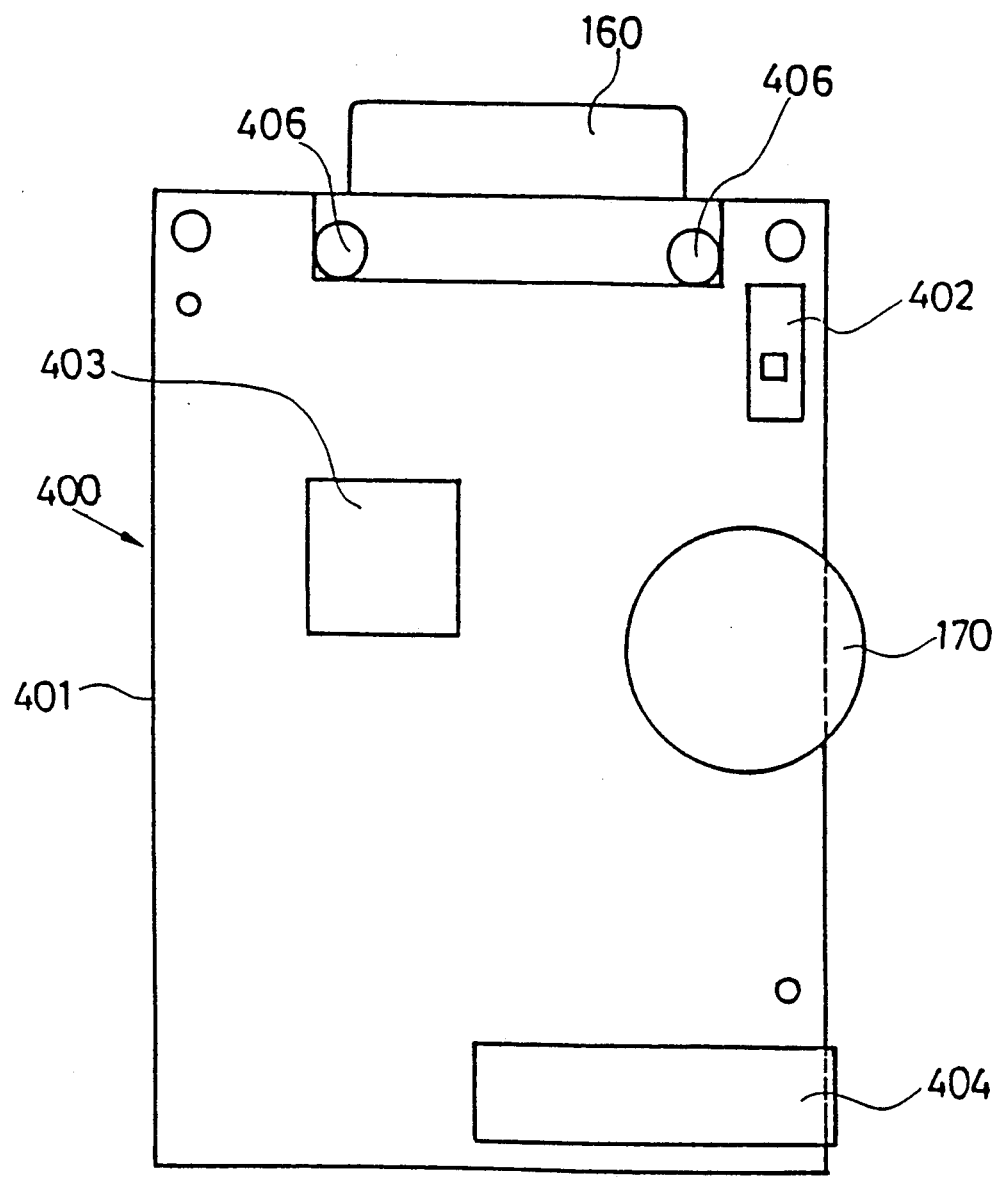
FIG. 7 is a schematic front view showing a control circuit board of the device.
Figure 8:
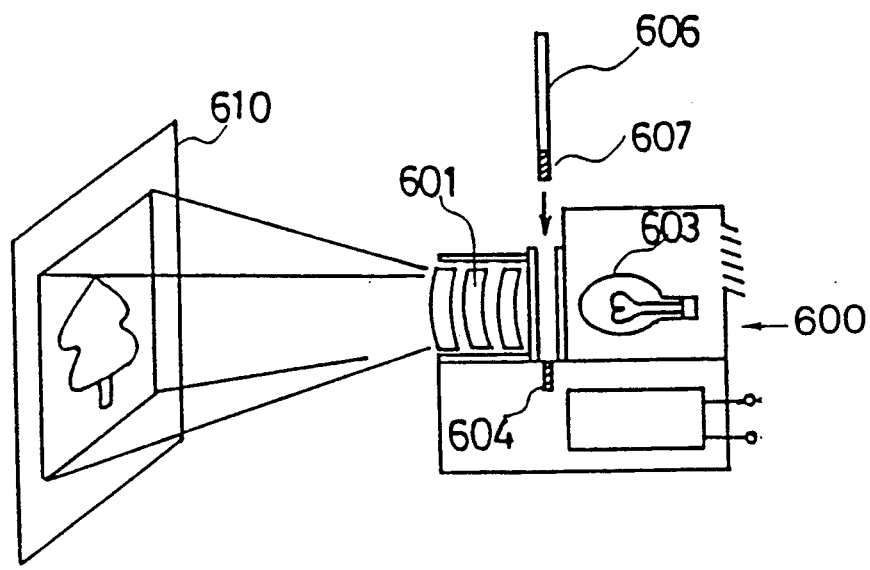
FIG. 8 is a schematic illustration showing a conventional liquid crystal display system.
Figure 9A:
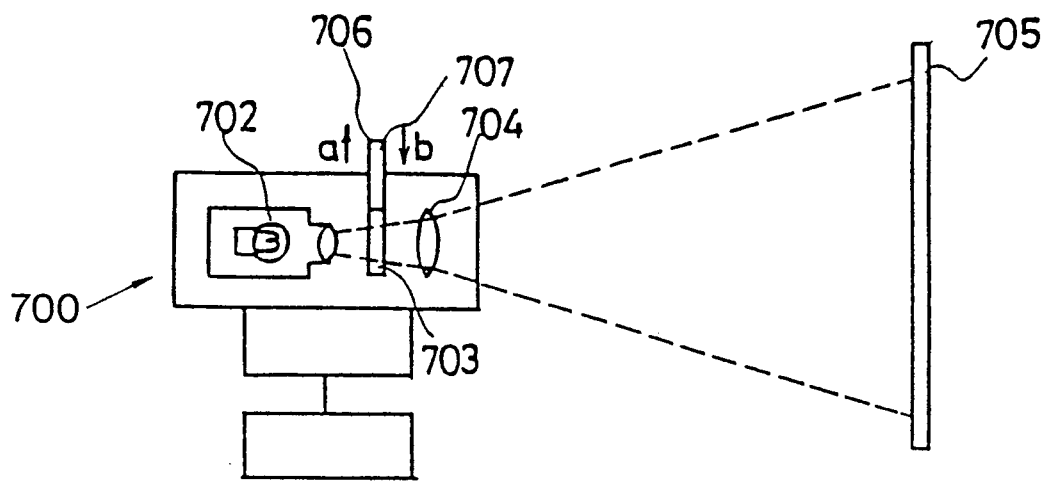
FIGS. 9a and 9b are schematic illustrations showing another conventional system.
Figure 9B:
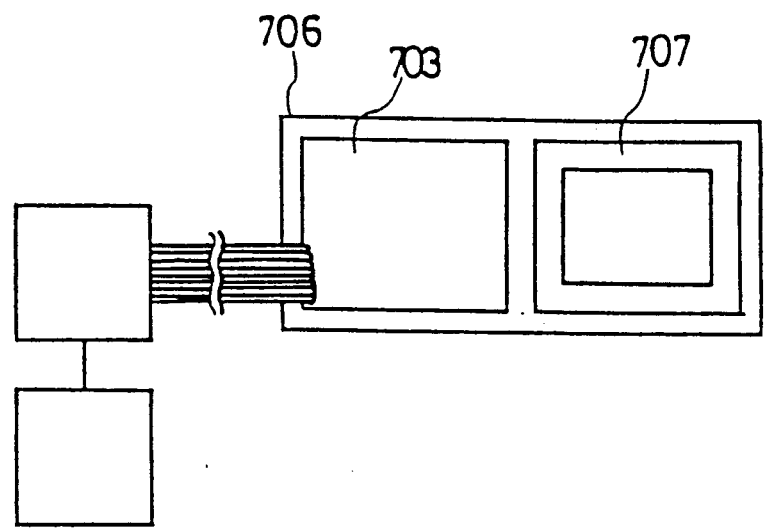

Referring to FIG. 7, the control circuit board 400 has a board 401 on which components of the control circuit board 400 are mounted. The external connector 160 is secured to the board 401 by screws 406 through nuts (not shown). A power switch 402 is connected to the power source button 150. A control circuit chip 403 is provided for processing signals from the external connector 160 and for converting the signals into signals for driving scanning and signal electrode driving circuit chips 303 and 304. The luminance dial 170 and the internal connector 404 are also provided on the board 401. Other components such as chip resistors, chip transistors, chip capacitors (not shown) are mounted on the board 401.

Since the driving circuit chips (303, 304) for driving the signal electrodes and the scanning electrodes are mounted on the glasses 301 and 302, the number of the input terminals 305 and 306 is largely reduced. If the driving circuits are not provided on the glasses and provided on the control circuit board 400, the number of the input terminals largely increases, so that the pitch between the input terminals becomes excessively small. For example, if the liquid crystal display panel 300 has 640 pixels in the row and 480 pixels in the column, the pitch Pi of the input terminals 306 is $$Pi = L1/640$$

Since the width L1 is 35 mm, the pitch Pi becomes $$Pi = 55 \ \mu m$$

It is very difficult to connect input terminals of 640 at pitch of 55 μm to the control circuit. The present invention solves such difficulty and enables the manufacturing of the small display device.

Figure 3:
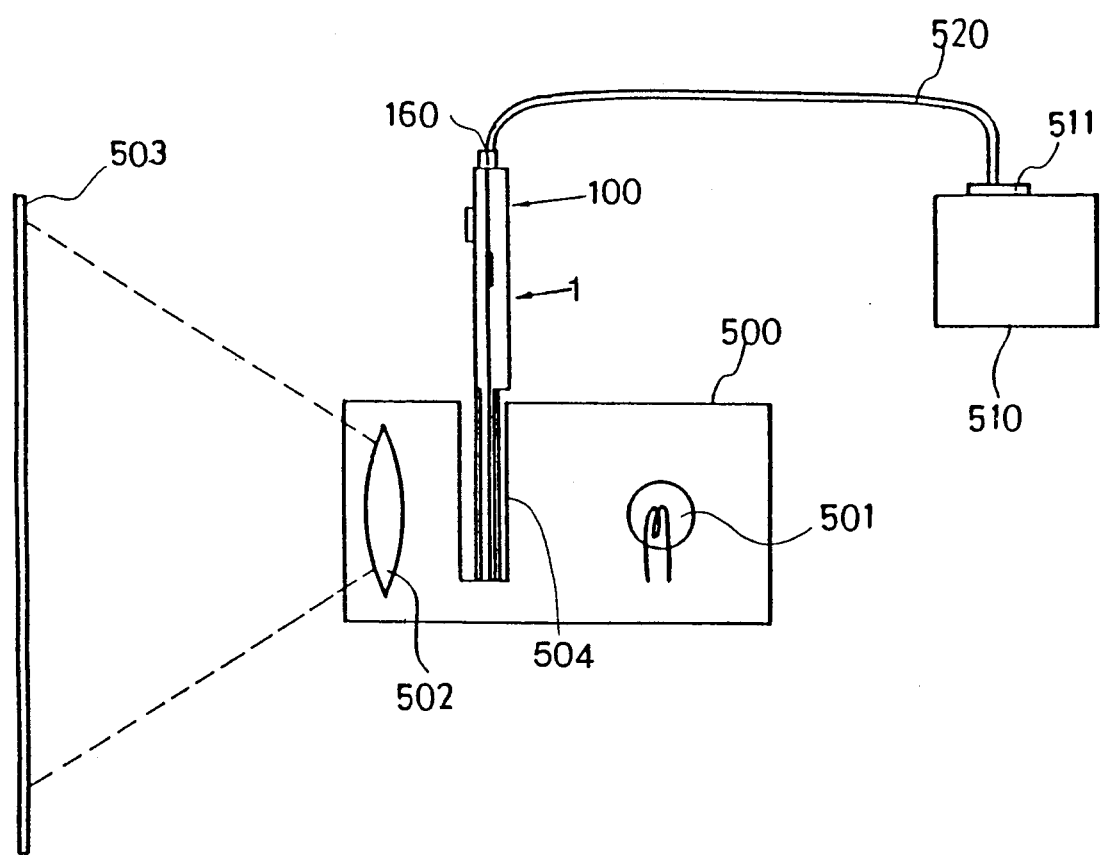
FIG. 3 is a schematic view showing an operation of the device.

Referring to FIG. 3, a slide projector 500 is an ordinary type, wherein a slide (not shown) is inserted into a slide receiving portion 504 in the vertical direction. In place of the slide, the housing 100 for the liquid crystal display device 1 is inserted into the slide receiving portion 504. The external connector 160 of the display device 1 is connected to a connector 511 of a computer 510 through a cable 520. An image signal from the computer 510 is applied to the display device 1 to display an image on the liquid crystal display panel 300. The image on the display panel 300 is illuminated by a light source 501 and projected on a screen 503 through a magnifying lens 502.

Figure 4A:
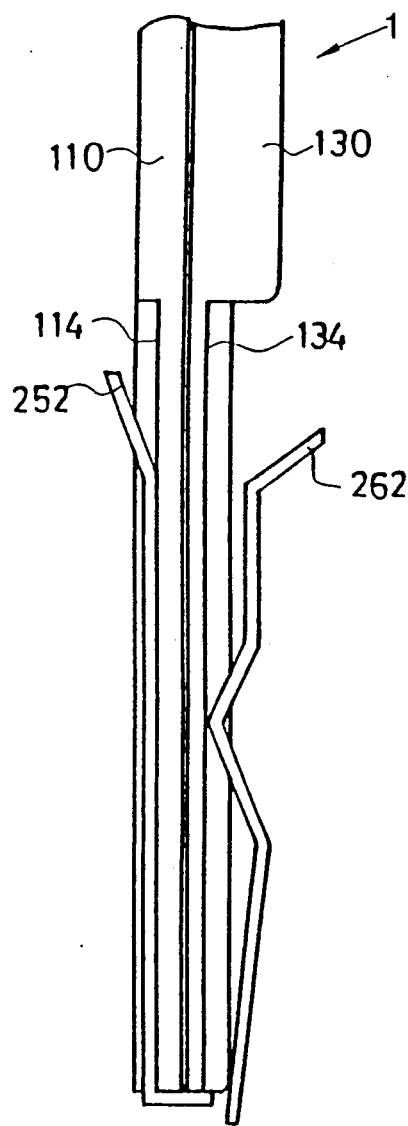
FIG. 4a is an explanatory side view showing a part of the device attached to a projector.
Figure 4B:
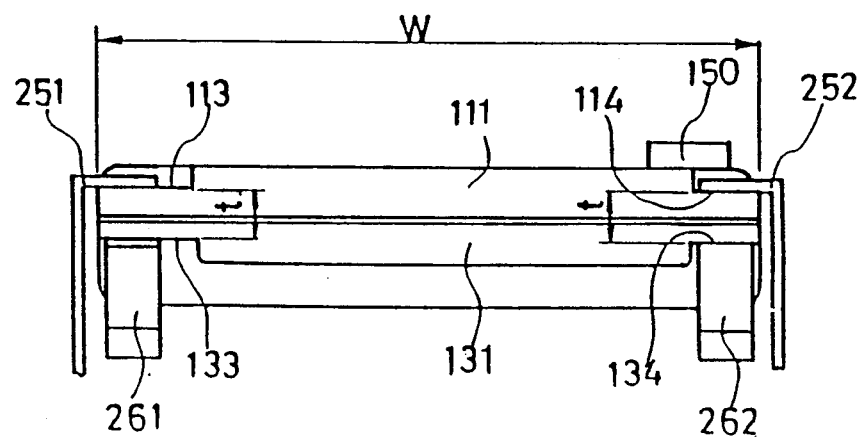

FIGS. 4a and 4b show an example of attachment members of the ordinary slide projector for attaching the display device 1 to the projector. The front and rear covers 110 and 130, panel housings 111 and 131 are the same as those of FIGS. 1a to 1d. In the slide receiving portion 504, a pair of supporting members 251 and 252 and a pair of spring plates 261 and 262 are disposed opposite to each other. When a lower portion of the display device 1 is inserted into the receiving portion 504, the supporting member 251 and the spring plate 261 engage the holding portions 113 and 133, and the supporting member 252 and the spring plate 262 engage the holding portions 114 and 134 to hold the display device 1. Thus, the liquid crystal display device 1 is fixed to the slide projector.

In accordance with the present invention, the panel housing of the liquid crystal display device has thin attached portions at both sides, the thickness of which is less than 6 mm. The width of the panel housing portion is about 50 mm. Thus, the display device can be used in the ordinary slide projector with ease. Consequently, it is very useful at a general meeting.

The display device is small in size, having a thin thickness and a light weight, thereby increasing the portability. If data are made on a personal computer and written in floppy disks, the user only takes the liquid crystal display device and the floppy disk to an operation place. Thus, it is unnecessary to carry a large projector.

The display device is not provided with the light source and the lens and the display panel thereof is small, thereby reducing the manufacturing cost and increasing the yield. Since the driving circuit chips are directly mounted on glasses of the liquid crystal display panel, the number of connecting terminals is reduced, so that reliability of connections between the terminals and the control circuit and workability of assembling are increased.

While the invention has been described in conjunction with preferred specific embodiment thereof, it will be understood that this description is intended to illustrate and not limit the scope of the invention, which is defined by the following claims.

What is claimed is:

1. A liquid crystal display device inserted between a light source and a lens of a projector for projecting an image on a liquid crystal display panel onto a screen, comprising:
    a housing including a front cover and a rear cover forming a panel housing portion and a control circuit housing portion of said housing which are longitudinally arranged, said liquid crystal display panel being housing in said panel housing portion;
    a control circuit housed in said control circuit housing portion;
    circuit chips mounted on glasses of said liquid crystal display panel for driving electrodes of the panel;
    connecting means for connecting said circuit chips with said control circuit; and
    a pair of attached portions formed on opposite longitudinal sides of said panel housing portion, which are arranged to be attached to the projector, a thickness of each of said attached portions being less than 6 mm, and a width of said panel housing portion being about 50 mm.

2. The liquid crystal display device according to claim 1, wherein said thickness of said attached portion is smaller than a thickness of said panel housing portion.

3. The liquid crystal display device according to claim 1, wherein said thickness of said panel housing portion is smaller than a thickness of said control circuit housing portion.

* * * * *